Figure 1:
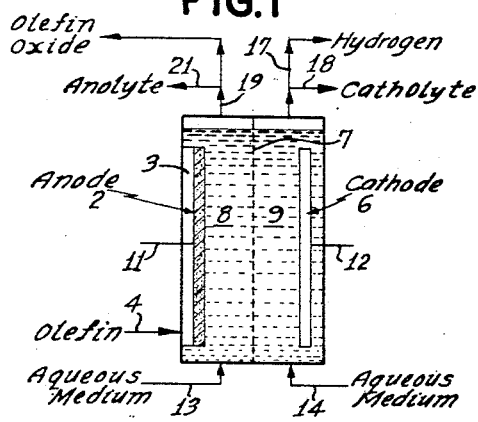

Feb. 11, 1969　　　　J. A. M. LE DUC　　　　3,427,235
ELECTROLYTIC PRODUCTION OF OLEFINE OXIDES
Filed Jan. 15, 1965

INVENTOR.
Joseph Adrien M. Leduc
BY John C. Quinlan
Marylin Klosty
ATTORNEYS

United States Patent Office 3,427,235
Patented Feb. 11, 1969

3,427,235
ELECTROLYTIC PRODUCTION OF OLEFINE OXIDES
Joseph Adrien M. Le Duc, Short Hills, N.J., assignor to Pullman Incorporated, Chicago, Ill., a corporation of Delaware
Filed Jan. 15, 1965, Ser. No. 425,758
U.S. Cl. 204—78    18 Claims
Int. Cl. C07d 1/08; B01k 1/00; C07b 3/00

This invention relates to a particular method for the production of oxide derivatives of olefinic compounds. More particularly the invention relates to the direct oxidation of olefinic compounds in an electrochemical system to produce the corresponding oxide derivatives.

Oxides of olefinic compounds, i.e., compounds containing the

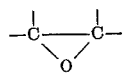

grouping, constitute a valuable group of organic chemicals which are useful as such or as building blocks for other chemicals and industrial products. Ethylene oxide and propylene oxide, for example, are used to produce the corresponding glycols. Ethylene glycol is used widely in the automotive antifreeze industry. Propylene glycol is used widely as an edible solvent for flavors. The olefin oxides are also useful in the manufacture of cellulosic textiles and, in recent years, large quantities of propylene oxide have been consumed in the manufacture of polyurethanes and has now become attractive for the production of rubber. These oxides and others such as styrene oxide are also useful in the manufacture of resinous condensation products such as those obtained by condensation of the oxide with phenol. Other industrial outlets for such oxides include their use as fumigants and non-ionic detergents.

One of the methods for producing ethylene oxide involves contacting ethylene and molecular oxygen with a silver catalyst such as silver-silver oxide deposited on a carrier such as corundum, at a high temperature such as between 270° C. and 290° C. One disadvantage of this vapor phase direct air oxidation method is that the formation of ethylene oxide is accompanied by the formation of carbon dioxide and water due to complete oxidation of some ethylene. This by-product formation is largely attributable to the difficulty of controlling the temperature of the catalyst bed and of avoiding high local temperatures or "hot spots" due to the exothermic nature of the reaction. When the method is applied to the oxidation of higher molecular weight olefinic compounds such as propylene, the adverse effects of localized overheating become more severe and substantial amounts of other oxygenated organic compounds such as carboxylic acids form in addition to carbon dioxide.

It is an object of this invention to provide a new and improved method for the production of oxides of olefinic compounds directly from an olefinic compound and oxygen.

Another object is to provide a method for the oxidation of olefinic compounds which allows for better control of reaction temperature.

A further object is to provide a method for the direct oxidation of olefinic compounds with oxygen in an aqueous reaction medium.

Various other objects and advantages of this invention will become apparent to those skilled in the art from the accompanying description and the disclosure.

Accordingly, the above objects are generally accomplished by the method which comprises providing an electrochemical cell containing an aqueous medium having an electrolyte dissolved therein, generating oxygen at the anode of said cell by subjecting said aqueous medium to an electrical current, feeding an olefinic compound to said cell such that it is brought into the vicinity of the anode, and recovering the oxide derivative of the olefinic compound as a product of the process. Oxygen is generated in situ as a result of the passage of the electrical current through the aqueous reaction medium, and its addition to the double bond of the olefinic reactant is activated by a catalyst such as silver in either elemental or combined form present in the anode or vicinity thereof. The aqueous reaction medium contained in the electrochemical cell is maintained in the liquid phase and at a temperature of at least 75° F. during operation of the cell, and olefin oxide product is recovered from gaseous cell effluent and/or from the aqueous reaction medium.

By the method of this invention the oxidation of the olefinic compound to olefin oxide is accomplished in the aqueous phase, several factors contributing to the improved performance of this method as compared with the prior art vapor phase air oxidative techniques. One factor is ease of temperature control of the liquid reaction medium such that high local temperatures at the reaction site are avoided, the tendency of complete oxidation of the olefinic compound to carbon dioxide thereby being minimized. Another factor is that the oxygen which is generated in situ is in the highly activated and reactive nascent state and thus the reaction can be effected at temperatures significantly below those employed in conventional vapor phase oxidative methods and is less dependent on a highly activated catalyst.

The term "olefinic compound" as used herein to decribe the reactant which is introduced to the vicinity of the anode is intended to include any organic compound containing at least one aliphatic or cycloaliphatic carbon-to-carbon double bond which is the reactive site at which the addition of the oxygen takes place to form the oxide linkage

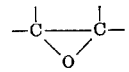

Thus the olefinic compound can be an acyclic monoolefin in which the point or points of unsaturation is terminal or non terminal including branched and straight chain compounds as well as cyclic olefins which may have an alkyl group bonded to the ring. The olefinic compound can also be substituted with other than alkyl groups such as aromatically unsaturated radicals including aryl and aralkyl groups. In addition to these hydrocarbon olefinic compounds, oxide derivatives of compounds substituted with halogen and preferably with the normally gaseous halogens (fluorine or chlorine) and/or carbonyl radicals can be produced by the method of this invention. Generally the olefinic compound has from 2 to 14 carbon atoms per molecule and usually from 2 to 10 carbon atoms.

Typical examples of suitable olefinic compounds which are epoxidized by the method of this invention are the alkenes of the homologous series, $C_nH_{2n}$, in which $n$ is an integer from 2 to 14 such as ethylene, propylene, butylene, pentene, hexene, heptene . . . tetradecylene; olefins in which the point of unsaturation is non-terminal such as 2-butylene and 2-pentene; branched olefins such as isobutylene, isopentene and 4-ethyl-2-hexene and 2-methenepentane; cyclic compounds such as cyclopentene and cyclohexene; polyolefins including those containing isolated, cumulative or conjugated double bonds such as diallyl, allene, butadiene, isoprene, 2,3-dimethyl butadiene and pentadiene-1,3; and substituted olefinic compounds such as allyl chloride, methylstyrene, styrene and stilbene.

The olefin need not be rigorously pure and may contain components normally found in commercially available olefins. For example, commercial grades of ethylene and propylene are suitable and normally contain low molecular weight paraffins such as ethane, propane, etc. which do not interfere with the oxidation reaction.

The aqueous reaction medium contains an electrolyte to improve the conductivity of the system. The electrolyte is any water soluble compound which does not interfere with the desired direct oxidation reaction of the olefinic compound in the vicinity of the anode under the particular operating conditions. For example, metal halides such as the alkali metal halides are unsuitable when the operating voltage of the cell is above the decomposition potential of the halides since they are electrolyzed to yield elemental halogen at the anode instead of the desired generation of oxygen. However, at lower voltages, i.e., at a voltage less than 2.5 volts, metal halides are suitable electrolytes. Also inorganic acids such as sulfuric acid and hydrohalic acids are unsuitable when the anodic catalyst or electrocatalyst comprises silver since they tend to cause dissolution of the catalyst as silver sulfates and halides, respectively. One class of suitable electrolytes are ternary oxygen-containing inorganic salts consisting of: (1) oxygen, (2) a metal such as the alkali metals, alkaline earth metals, and cadmium, and (3) either another metal such as molybdenum, tungsten, chromium, zinc, bismuth, antimony, vanadium, tellurium, selenium, aluminum and tin, or a non-metal such as silicon, phosphorus, boron and sulfur. Representative of this class of electrolytes are the water soluble molybdates, stannates, tungstates, aluminates, bismuthates, zincates, silicates, phosphates, borates, sulfates and chromates. The alkali metal salts are preferred because of their greater water solubility. Typical examples of suitable ternary salts for use as the electrolyte in the method of this invention are: potassium bisulfate, potassium metaborate, potassium tetraborate, potassium molybdate, potassium stannate, potassium sulfate, potassium ortho-, meta-, and paratungstates, sodium aluminate, sodium zincate, sodium bisulfate, sodium metaborate, sodium tetraborate, sodium molybdate, sodium persulfate, sodium stannate, sodium tungstate, sodium bismuthate, sodium antimonate, lithium chromate and cadmium sulfate.

Also included within the scope of this invention is the use of water soluble hydroxides including the alkali metal and alkaline earth metal hydroxides such as potassium hydroxide, sodium hydroxide, lithium hydroxide and barium hydroxide. Another class of suitable electrolytes are the water soluble salts of organic acids such as the alkali metal citrates, oxalates, gluconates, benzoates, phthalates, formates, etc. A fourth group of suitable electrolytes are the inorganic and organic peracids such as permolybdic, peracetic, percarbonic, perchromic, performic, pernitric, perphosphoric acids, etc. When used as the electrolytes in the process of this invention, the peracids function primarily as conductors and, since they decompose with release of oxygen at temperatures within the range at which the present process is operated, they also serve as a supplemental source of reactive oxygen for the catalytic oxidation of the olefinic compound at the anode.

The concentration of the dissolved electrolyte in the aqueous medium is not critical to the successful course of the direct oxidation of the olefinic compound and may vary over a relatively wide range such as from dilute to saturated solutions. To provide optimum conductivity, however, it is preferred to employ a solution having at least 0.1 weight percent (measured at 25° C.) of the electrolyte dissolved therein. The upper concentration, i.e., saturated solutions, is of course dependent upon the solubility of the particular electrolyte under the particular conditions of temperature and pressure at which the cell is operated. Included within the scope of this invention is the use of mixed electrolytes including two or more of the aforesaid compounds such as, for example, the combination of sodium zincate and sodium hydroxide.

The process of this invention is carried out in an electrochemical cell containing water having one of the aforesaid electrolytes dissolved therein and is fitted with at least one anode and cathode, the olefinite compound being charged to the anodic region of the cell. The cell is operated over a wide range of anodic current density such as between about 50 and about 1000 amperes per square foot of apparent electrode surface and more usually at a current density of from about 300 to about 500. The operating voltage of the cell is at least that voltage required to obtain electrolysis of water, i.e., at least 1.23 volts. Usually however the voltage demand is increased above this minimum or decomposition voltage due to a variety of factors such as polarization and overvoltage and ohmic losses. The olefinic compound introduced to the anolyte region tends to reduce the overvoltage and thereby decreases polarization effects. Generally the operating voltage of the cell ranges between about 1.8 and about 8.0 volts and is more usually between about 2.2 and about 3.5 volts.

The overall reaction which takes place within the cell is illustrated by the following general equation wherein the grouping

represents the reactive site of the olefinic compound at which oxidation takes place at the anode:

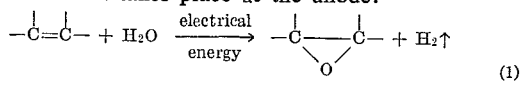

(1)

As seen from this general equation the source of oxygen in the oxide derivative is the water of the aqueous medium, and hydrogen is produced as a second valuable and recoverable product of the process. It is to be understood that the oxygen-containing electrolyte which functions as a carrier of the electrical current through the aqueous liquid reaction medium, may as in the case of the aforesaid peracids, also function as a supplemental source of oxygen reactant without departing from the scope of this invention. It will be further understood that an oxygen-containing gas such as substantially pure molecular oxygen or air may be supplied to the anodic region as a secondary source of oxygen without departing from the scope of this invention and without hindering the internal electrochemical generation of oxygen in its most active and nascent form.

The process of this invention is effected by maintaining the temperature of the aqueous medium within the electrochemical cell or reaction zone from about 75° F. to about 600° F. Usually the temperature is from about 90° F. to about 400° F. The pressure may be substantially atmospheric pressure or above atmospheric such as up to about 200 atmospheres. Temperature and pressure are interrelated to the extent that they are controlled to maintain the aqueous medium in the liquid phase. Thus when the cell is operated at a temperature below the atmospheric boiling point (e.g., about 220° F.), the cell is suitably operated at substantially atmospheric pressure. When operating at higher temperatures such as about 500° F., for example, the aqueous medium is maintained under a pressure of at least 700 pounds per square inch in order to maintain the liquid phase.

The electrodes of the electrochemical cell which may be of the diaphragm or diaphragmless type, are formed of an electrically conductive material such as graphite, carbon, silver, nickel, nickel-plated iron, platinized titanium or tantalum, magnetite, and metallic alloys such as platinum, palladium, iridium, etc., with titanium or tantalum. In order to activate the reaction between the olefinic reactant and the nascent oxygen generated at the anodic surface, the anode is catalytic. Among the catalysts of which the anode can be composed or which are incorporated into the anode are those comprising silver, zinc, bismuth, cadmium, lead, manganese, cobalt, copper, molybdenum, vanadium, tungsten and chromium. These metals can be present in either elemental or combined form. For example, the anodic catalyst may be in the form of oxides of the aforesaid metals in their various valence states such as the silver oxides ($Ag_2O$ and $AgO$), tungsten dioxide, tungsten trioxide, zinc oxide, cobalt oxide, etc., or various combinations thereof such as silver-silver oxides, zinc-zinc oxide, etc. The anode also may contain co-catalysts or promoters in addition to the primary catalyst such as barium, the rare earth metals and salts thereof. Representative of the anodes which are employed are those composed of substantially pure silver or commercially available porous graphite or carbon in which silver has been incorporated. The content of silver, expressed as elemental silver, may vary from about 0.1 to 100 percent by weight of the anodic surface. Another type of suitable anode is formed of a plastic substrate such as polyethylene polymer which has been catalyzed with silver powder or silver compound by sintering, sifting or electroplating techniques.

The anode may be non-porous and in the form of a solid blade in which case the olefinic reactant is charged directly to the aqueous medium in the anodic region such that it is intimately contacted with nascent oxygen formed at the anode during passage of the electrical current through the aqueous medium. In accordance with another mode of operation and in order to provide a large reactive surface, the anode is porous and in the form of a hollow blade and the olefinic reactant is fed to the inner chamber of the anode. The olefinic reactant diffuses through the pores of the anode towards the aqueous medium and reacts at the interface of the pores where contact between the aqueous medium, nascent oxygen, olefinic compound and catalytic anodic surface occurs. The reactive surface for the oxidation of the olefinic compound is also increased by operating with one or more of the aforesaid oxidation catalysts immersed in the aqueous medium in the vicinity of the anode. The anodic surface is also increased by using anodes provided with vertical grooves along the outer surface of either substantially straight or sinuous contour.

The method for charging the olefinic compound to the anode depends largely on its physical state. For example, the lower alkenes such as those having from 2 to 4 carbon atoms per molecule are normally gaseous and can be fed as such to the inner chamber of the porous hollow blade type anode, or directly to the aqueous medium in the vicinity of the anode when a non-porous solid blade is employed. Normally liquid olefinic reactants such as allyl chloride are charged similarly in liquid form, or when sufficiently volatile under the operating conditions of the cell are fed in the vaporized state or in a carrier gas saturated with the vapor. Normally solid olefinic compounds are fed to the anode preferably in the form of a solution or dispersion in any suitable organic solvent such as paraffins or aromatics or mixtures thereof including petroleum fractions such as hydrogenated kerosene.

In accordance with one embodiment of the process of this invention, the cell is operated such that hydrogen is generated at the cathodic surface as a second product of the process as shown by Equation 1 above. In accordance with this embodiment, and for economic practical reasons, the cathode is usually formed of a ferrous metal such as steel, stainless steel or lead and need not contain a catalyst, although it is to be understood that any one of the aforesaid electrode materials is also suitable.

The process is operable in a batch-wise or continuous manner. From the standpoint of avoiding build-up of reactants and products in the aqueous medium over prolonged periods of operation and minimizing side reactions and concentration polarization effects, the cell is usually operated with continuous circulation of the aqueous medium. In conducting the process in a continuous manner, the aqueous medium is continuously fed to the cell and olefinic compound is continuously introduced to the anodic region. Unreacted excess olefin when sufficiently volatile as in the case of the lower alkenes, passes from the cell as gaseous effluent together with volatile oxide product. The gaseous effluent is then treated to separate and recover the oxide product, and unreacted olefin is recycled to the cell. In addition to recovery of the volatile oxide from the gaseous effluent it also is recoverable from the aqueous electrolyte medium. The latter is accomplished by any suitable separation technique such as by passing the aqueous medium through vacuum operated flash towers or strippers to remove the bulk of the olefin oxide product. Small amounts of any residual olefin oxide product are readily recovered by passing the aqueous medium from the fractional distillation zone to a stripping zone in which air, hydrogen or other inert gas is used as the stripping medium.

Figure 2:
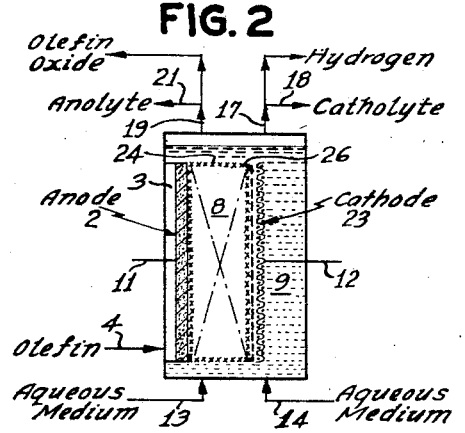
Figure 3:
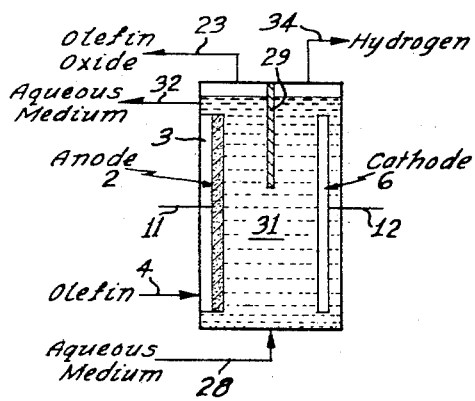
Figure 5:
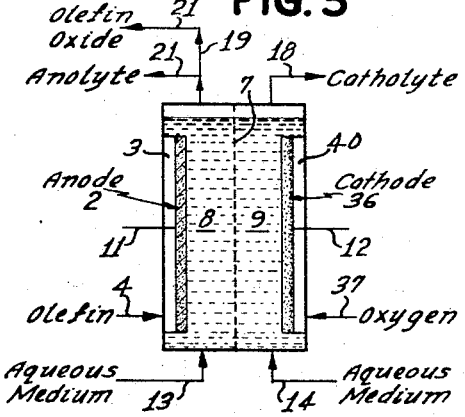
Figure 4:
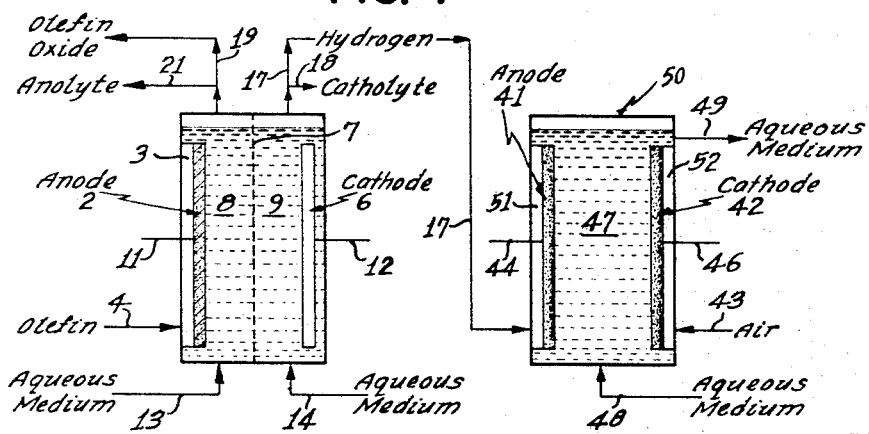

A further discussion of the process of this invention is had with reference to FIGURES 1-5 of the accompanying drawing. FIGURES 1 and 2 illutrate suitable diaphragm cells, and FIGURE 3 illustrates a suitable diaphragmless cell, in which the process can be effected. FIGURES 4 and 5 illustrate methods by which the power requirements of the process is reduced such as by operating the cell in combination with a hydrogen-oxygen fuel cell (FIGURE 4) or by introducing oxygen to the cathode of the olefin oxide producing cell (FIGURE 5). For convenience in the discussion of the drawing, the same reference numerals are used to indicate the same parts in the several figures.

The cell of FIGURE 1 comprises cathode 6, porous anode 2 having chamber 3, and a fluid permeable diaphragm designated schematically by numeral 7 which separates the cell into anode and cathode compartments containing anolyte 8 and catholyte 9, respectively. The term "anolyte" as used herein refers to the aqueous medium at and in the vicinity of the anode, i.e., in the anode compartment, of the electrochemical cells of the diaphragm type. Likewise, the term "catholyte" refers to the aqueous medium at and in the vicinity of the cathode, i.e., in the cathode compartment, of the electrochemical diaphragm cells. The diaphragm may be in the form of a mat, sheet or woven cloth and is suitably made of asbestos, polyethylene, glass, tetrafluoroethylene, polyvinyl chloride, porous ceramic materials, tetrafluoroethylene-glass laminations or any other materials known to the art as suitable for diaphragms of electrochemical calls. When the process is effected at temperatures above the atmospheric boiling point and under pressure, the diaphragm is formed of a material such as asbestos stiffened with cement. Electrical energy is supplied to anode 2 and cathode 6 by means of anode terminus 11 and cathode terminus 12, respectively. In operation aqueous medium containing one of the aforesaid electrolytes is introduced to the anode and cathode compartments by means of lines 13 and 14, respectively, and olefinic reactant is fed to anode chamber 3 by means of line 4. The olefinic reactant diffuses through the pores of anode 2 which is composed of one of the aforesaid anodic materials such as silver or graphite containing silver, and reacts at the anolyte-anode-olefin interface with nascent oxygen generated at the anodic surface. Anolyte 8 containing dissolved olefin oxide product is withdrawn from the anode compartment by means of line 21 and is subsequently treated as described above to recover the dissolved product and is then recycled to the cell. Gaseous effluent evolved from the anode compartment is withdrawn by means of line 19 and contains, in addition to unreacted olefinic compound, olefin oxide product when sufficiently volatile. The olefin oxide product is separated from the unreacted olefin and the latter is recycled to the anode. Gaseous effluent containing hydrogen evolved from the cathode compartment is withdrawn from the cell by means of line 17 and the catholyte is discharged by means of line 18. During operation some anolyte containing dissolved olefin oxide product may pass through fluid permeable diaphragm 7 into the catholyte. In order to minimize build up of olefin oxide product in the catholyte, a portion of the catholyte withdrawn by means of line 18 may be combined with the aqueous medium fed to the anode compartment by means of line 13, or may be combined with anolyte withdrawn by means of line 21, the remainder of the catholyte being recycled to the cathode compartment.

Also included within the scope of this invention is the use of a catalyst in the anode compartment as is shown by FIGURE 2. In the cell of FIGURE 2, which is otherwise the same as the cell of FIGURE 1, the cathode is shown in the form of screen 23 having diaphragm 26 in association therewith and the anode compartment to which aqueous medium is fed by means of line 13 is packed with catalyst 24. Catalyst 24 may be in the form of lumps, powder, granules or in compacted form, and is confined within the anode compartment by means of diaphragm 26 or other fluid permeable material such as a fine mesh screen which may also be positioned across the lower portion of the anode compartment. The catalyst also may be self-contained such as within a screen framework or within a woven, flexible fabric such as asbestos, polyethylene, polytetrafluoroethylene, Dynel and the like. The self-contained catalyst also may be positioned in the vicinity of the anode of a diaphragmless cell. The catalyst which is immersed in the anolyte is any one of the aforesaid anodic catalysts such as silver, silver oxides and mixtures thereof such as Ag-AgO-Ag$_2$O and may or may not be the same as the catalyst of which anode 2 is formed or which is incorporated into the anode. As stated above one advantage of operating the process in a cell of the type shown by FIGURE 2 is that the particles of catalyst provide a large reactive surface for the reaction between the olefinic reactant and nascent oxygen generated at the anode.

Although a diaphragm as shown in the cells of FIGURES 1 and 2, is not essential to the successful production of olefin oxide product by the method of this invention, it is advantageously used since it facilitates recovery of the olefin oxide product from gaseous cell effluent by substantially preventing the volatilized product evolved from the anolyte from mixing with the cathodic gas evolved from the catholyte. A particularly suitable cell of the diaphragm type in which the process of this invention can be effected is described and claimed in my prior and copending application Ser. No. 299,519 filed Aug. 2, 1963 and now Patent No. 3,342,717. It is to be understood that the process of this invention also can be effected in a diaphragmless cell in which event, however, gaseous cell effluent ordinarily comprises a mixture of the anodic and cathodic gases.

In order to facilitate recovery of product when a diaphragmless cell is employed and thus reduce the number of steps involved in separating gaseous cell effluent, it is desirable to place a solid partition in the dome of the cell such that the gases evolved from the aqueous medium in the anodic and cathodic regions do not intermix. For example, such a partition is shown in the diaphragmless cell of FIGURE 3 which comprises porous anode 2 having chamber 3 to which olefin reactant is fed by means of line 4, cathode 6, inlet 28 by means of which aqueous medium 31 is fed to the cell, and solid partition 29 partially immersed in the aqueous medium and positioned substantially midway between the anode and cathode and extending above the level of the aqueous medium such that the vapor space above the aqueous medium is also divided. By the use of solid partition 29, gaseous effluent comprising unreacted olefin and olefin oxide product evolved from the anodic region is prevented from intermixing with the hydrogen-containing gas evolved from the area of the cathode and passes from the cell as a separate stream by means of line 23. Similarly, hydrogen-containing gas evolved from the cathodic region is obtained as a separate stream and removed from the cell by means of line 34. Aqueous medium is discharged from the cell by line 32 and, after treatment to remove dissolved olefin oxide product, is recycled to the cell.

In accordance with another embodiment of this invention, the power required from an external source for operation of the olefin oxide producing electrochemical cell is substantially reduced by operating the cell in combination with a hydrogen oxygen fuel cell as illustrated by accompanying FIGURE 4. In accordance with this embodiment, the hydrogen generated at cathode 6 of the olefin oxide cell is passed therefrom by means of line 17 to chamber 51 of anode 41 of hydrogen-oxygen fuel cell 50, while an oxygen-containing gas such as substantially pure molecular oxygen or air is passed to chamber 52 of porous gas diffusion cathode 42 by means of line 43. Such a fuel cell is known to the prior art and is operated using aqueous alkaline, neutral or acidic solutions. When the electrolyte medium 47, fed to the cell by means of line 48, is alkaline, aqueous solutions of the alkali metal hydroxides, usually potassium hydroxide, are employed. Aqueous medium is withdrawn from fuel cell 50 by means of line 49. The fuel cell is operated at temperatures from about 70° F. to about 170° F. and pressures of 1 to 10 atmospheres. Porous anode 41 of the fuel cell may be composed of catalyzed carbon, nickel, palladium or platinum, and porous cathode 42 is formed of silverized carbon, silver or nickel. Electrical current at a voltage from 0.7 to 1.0 volt is generated by this type of fuel cell and is withdrawn therefrom by means of bus bar connections shown schematically by lines 44 and 46 and is supplied as a partial source of power to the olefin oxide producing cell. In this manner, about 30–40 percent of the power expended for the production of the olefin oxide is recovered.

The power required for the operation of the olefin oxide producing cell is also substantially reduced by introducing an oxygen-containing gas directly to the cathode of the cell as shown by FIGURE 5. In the cell of FIGURE 5, which is otherwise the same as that of FIGURE 1, an oxygen-containing gas including air or substantially pure molecular oxygen is fed to chamber 40 of porous gas diffusion cathode 36 by means of line 37 while an olefinic reactant is fed to anode 2 as described above. In this manner, water is regenerated at the cathode, molecular hydrogen is not evolved from the catholyte, and a gain in voltage of about 0.2 volt is realized as a result of depolarization of the cathode. Further reduction in the voltage requirements is achieved by operating the cathode of the olefin oxide cell as an oxygen half-cell. This is accomplished by utilization of a cathode containing an activator such as silver for the reaction between oxygen in the gas supplied to the cathode, and the water of the aqueous electrolyte medium according to the following equation:

$$O_2 + 2H_2O \rightarrow 4OH^-$$

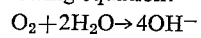

The standard potential of such an oxygen half cell is 0.401 volt, when no peroxide ion is formed. The formation of peroxide is inhibited by using cathodes containing or composed of silver, manganese, cobalt, nickel, iron or alloys thereof. A suitable cathode for use in the olefin oxide cell in accordance with this embodiment of the present invention is a porous gas diffusion cathode formed of graphite or carbon having one of the aforesaid activators homogeneously distributed therein. By operating the cathode of the olefin oxide producing cell as an oxygen half cell, the voltage requirements are reduced by about 8 to 10 percent, and the generation of hydrogen is avoided.

The following examples are offered as a further understanding of the present invention and are not to be construed as unnecessarily limiting thereto.

Example 1

An electrochemical cell of the type shown by FIGURE 1, is fitted with a stainless steel screen as the cathode and a porous anode composed of graphite containing silver-silver oxide as catalyst, the anode and cathode compartments being separated by an asbestos sheet diaphragm supported by the cathodic screen. Aqueous solution containing potassium tetraborate (0.5 molar) is continuously fed to each of the anode and cathode compartments at a flow rate of 40–50 cc. per minute. Ethylene is fed to the back compartment of the porous anode at an average flow rate of 70 cc. per minute. A direct current to 60 amperes per square foot of apparent electrode surface is passed across the cell and the cell is operated under these conditions at a temperature of 100° F. at atmospheric pressure. As a result of this operation, ethylene oxide product is formed at the anode and a portion thereof is contained in the gaseous effluent evolved from the anolyte, the gaseous effluent being subsequently treated to separate the ethylene oxide (approximately 0.1 mol. from excess olefin. The anolyte which is continuously withdrawn from the anode compartment is treated to recover additional ethylene oxide product dissolved therin such as by fractional distillation. A faradic quantity of hydrogen is evolved from the cathode compartment. The catholyte which is also continuously withdrawn from the cell is recirculated to the cathode compartment.

Example 2

A diaphragmless electrochemical cell is fitted with a stainless steel screen as the cathode and a porous sintered anode composed of silver powder and containing freshly precipitated silver as catalyst. The anode is prepared by admixing silver powder with freshly precipitated silver made by reacting silver nitrate and sodium bromohydride, and sintering the admixture at a temperature of 500° C. for 3 hours. Aqueous solution containing 150 grams per liter of dissolved sodium hydroxide is continuously charged to the cell in the vicinity of the anode at a rate of 3.5 liters per hour. Gaseous propylene is fed to the back compartment of the porous anode at a rate of 50 cc. per minute. The cell is operated at a temperature of 120° F. at atmospheric pressure under a direct current at an anodic intensity of 5 amperes at 2.8 volts. Under these conditions approximately 0.06 mol of propylene oxide is recovered from the gaseous cell effluent and approximately 0.26 mol of hydrogen. Additional propylene oxide product is recovered from the aqueous medium by fractional distillation.

Example 3

An electrochemical cell is fitted with a stainless steel cathodic screen and a silver anode containing silver oxide. The anode is prepared by the following series of steps: (1) an admixture containing 40 percent by weight of silver powder and 60 percent by weight of freshly precipitated silver catalyst made by reacting silver nitrate and sodium borohydride is pressed between two 200-mesh silver screens to form a layer having a thickness of 0.125 inch; (2) the pressed admixture is sintered at 500° C. for a period of 2 hours; (3) the sintered electrode is anodized in a solution containing potassium hydroxide (12 percent weight) and lithium hydroxide (1 percent weight) at 75° F. with periodic reversal of polarities under a sufficient current, i.e., 0.5 ampere for 15 minutes as anode and 0.3 ampere for 13 seconds as cathode, to obtain a silver oxide content of 2 weight percent. The electrochemical cell fitted with the cathodic screen and the said anode, is charged with an aqueous solution of sodim hydroxide (150 grams per liter). Butylene is fed to the back of the porous anode at a rate of 35 cc. per minute. The cell is operated as a static system, i.e., without circulation of the aqueous electrolyte medium, at a temperature of about 175° F. for a period of three hours at atmospheric pressure, a current density of 200 amperes per square foot of electrode surface and a voltage drop of 3.0 volts. Under these conditions approximately 0.5 mol of butylene oxide is produced and recovered from gaseous cell effluent and aqueous medium.

Example 4

An electrochemical cell fitted with a stainless steel cathodic screen and a porous silver anode prepared as described under Example 3 above is further provided with an asbestos sheet diaphragm separating the cell into an anode and cathode compartment. The anode compartment is filled with granulated silver oxide as illustrated by FIGURE 2. An aqueous solution of sodium benzoate (40 grams per 100 cc.) is fed to the cell which is operated as a static system, that is, without circulation of the aqueous solution. Ethylene is fed to the back of the porous anode at a rate of 75 cc. per minute while maintaining the temperature of the aqueous solution at 140° F. The cell is operated at atmospheric pressure under an applied current of 10 amperes at a voltage of 3.0 volts. Under these conditions ethylene oxide is produced as a product of the process and approximately 0.2 mol is recovered from the gaseous cell effluent evolved from the anode compartment.

Example 5

An electrochemical cell of the type illustrated by FIGURE 3, is provided with a steel screen as cathode and a silverized porous graphitic anode prepared by incorporating freshly precipitated silver into porous graphite and treating the mixture at 250° F. for 4 hours. Aqueous solution containing sodium citrate (35 grams per 100 cc. of solution) is continuously fed to the cell at a flow rate of 40 cc. per minute. Propylene is fed to the back of the porous anode at a rate of 30 cc. per minute. The cell is operated at a temperature of 135° F. at atmospheric pressure under a current intensity of 13 amperes and 3.7 volts. Gaseous propylene oxide product and excess propylene evolved from the anolyte are prevented from mixing with the hydrogen gas evolved from the catholyte by the solid partition, designated by numeral 29 of FIGURE 3, positioned in the top of the cell.

Example 6

An electrochemical cell is provided with a stainless steel cathodic screen having a diaphragm formed of asbestos paper (25 mils in thickness) deposited thereon. The cell is also provided with the silver-silver oxide anode prepared in accordance with the procedure of Example 3 above. As illustrated by FIGURE 2, the anode compartment is filled with granules of tungsten oxide having a relatively small diameter but large enough not to pass through the diaphragm. Aqueous solution containing sodium tungstate (0.6 molar) is continuously fed to the cell at a flow rate of 25 cc. per minute. Ethylene is fed to the back of the porous anode at a rate of 30 cc. per minute. The cell is operated under an applied current of 6 amperes at a voltage of 2.4 volts and at a temperature of 125° F. at atmospheric pressure. Under these conditions approximately 0.3 mol of ethylene oxide is produced and recovered from the anodic gaseous cell effluent and aqueous medium.

Example 7

An electrochemical cell is provided with a stainless steel screen as cathode having a porous polyethylene diaphragm supported thereon, and a porous zinc anode containing zinc oxide. The anode is prepared by anodizing a porous zinc electrode in a solution of potassium hydroxide (10 weight percent) and lithium hydroxide (1 weight percent) at 75° F. with a periodic reversal of polarities of 10 to 1 to produce zinc oxide on the surface of the electrode. Aqueous solution containing 30 percent by weight of sodium zincate (prepared by mixing sodium hydroxide and zinc oxide) is charged to the cell continuously at a flow rate of 12 cc. per minute. The cell is operated under a current density of 75 amperes per square foot of electrode surface at a voltage of 3.1 volts and at a temperature of 125° F. at atmospheric pressure. Under these conditions ethylene oxide in an amount of about 0.7 mol is recovered from the gaseous cell effluent and aqueous medium.

Example 8

A diaphragmless electrochemical cell is fitted with a steel cathodic screen and a porous silver-silver oxide anode produced in accordance with the procedure of Example 3 above. Aqueous solution containing 20 grams per liter of potassium carbonate is continuously fed to the cell at a rate of 25 cc. per minute. Ethylene is fed to the back compartment of the porous anode at a rate of 35 cc. per minute. The cell is operated at a current intensity of 10 amperes and at a temperature of 90° F. at atmospheric pressure. The IR drop across the cell is 5 volts. Under these conditioins, percarbonate is formed but due to its instability at the operating temperature, nascent oxygen is continuously formed in situ and reacts with the ethylene in the presence of the catalytic silver anode to form ethylene oxide products.

Example 9

A cell fitted with a porous anode formed of a porous silver matrix catalyzed with silver oxide and a gas diffusion cathode composed of silver catalyzed carbon is charged with an aqueous medium containing 450 grams per liter of dissolved potassium hydroxide, at a rate of 30 cc. per minute. Propylene is passed to the back compartment of the porous anode at a rate of 25 cc. per minute and air is passed to the cathode at a rate of 60 cc. per minute. The cell is operated at a current density of 550 amperes per square foot of electrode surface, at a voltage of 2.1 volts, and the aqueous medium is maintained at a temperature of 150° F. Under these conditions, 0.2 mol of propylene oxide is recovered from the gaseous cell effluent, and an additional 0.7 mol is recovered from the aqueous medium. Substantially no hydrogen is produced, the voltage at which the cell is operated being about 9 percent less than that required when the oxygen-containing gas is not introduced to the cathode of the cell.

From the foregoing it is apparent that the process of this invention may be applied in a number of different ways and that various olefinic compounds, electrolytes, and operating conditions can be employed to produce the desired olefin oxide product, and it is to be understood that various alterations and modifications may be made without departing from the scope of this invention.

What is claimed is:

1. A process for the formation of an oxide of an olefinic compound which comprises providing an electrochemical cell having an anodic and cathodic surface and containing an aqueous medium, generating oxygen at the anodic surface by subjecting the aqueous medium to the action of an electrical current, passing an olefinic compound to said cell such that it is contacted with oxygen generated at the anodic surface, operating said cell under conditions such that the aqueous medium is maintained in the liquid phase and at a temperature of at least 75° F., and withdrawing effluent from said cell containing an oxide of said olefinic compound.

2. A process for the formation of an oxide of an olefinic compound which comprises subjecting an aqueous medium contained in an electrochemical cell and having an oxygen-containing electrolyte dissolved therein, to the action of an electrical current such that oxygen reactant is generated at the anodic surface, maintaining said aqueous medium in the liquid phase and at a temperature of at least 75° F., passing an olefinic compound to said cell such that it is brought into contact with the oxygen generated at the anodic surface, said anodic surface comprising a catalyst for the oxidation of the olefinic compound with said oxygen, and withdrawing effluent from said cell containing the oxide derivative of the olefinic compound.

3. The process of claim 2 in which said olefinic compound is a normally gaseous olefin.

4. The process of claim 3 in which said olefin is ethylene.

5. The process of claim 3 in which said olefin is propylene.

6. The process of claim 3 in which said olefin is butylene.

7. The process of claim 2 in which said catalyst comprises silver.

8. The process of claim 2 in which said catalyst comprises zinc.

9. A process for the manufacture of an olefin oxide which comprises providing an electrochemical cell divided into at least one anode compartment and at least one cathode compartment by a fluid permeable diaphragm, passing an aqueous medium having an oxygen-containing electrolyte dissolved therein to the anode and cathode compartments, feeding an olefin to the cell such that it is contacted with the anodic surface, subjecting said aqueous medium to the action of an electrical current such that oxygen is generated at the anodic surface, said anodic surface comprising a catalyst for the oxidation of the olefin with oxygen generated at the anode, maintaining said aqueous medium at a temperature of at least 75° F. and in the liquid phase, withdrawing effluent from the anode compartment comprising the oxide derivative of said olefin, and withdrawing gaseous effluent from said cathode compartment comprising hydrogen.

10. A process for the manufacture of an olefin oxide which comprises subjecting an aqueous medium comprising an alkali metal hydroxide to the action of an electrical current to generate oxygen at the anodic surface, passing a normally gaseous olefin to the cell such that it is brought into contact with the anodic surface, said anodic surface comprising silver, maintaining said aqueous medium in the liquid phase at a temperature of at least 75° F. and withdrawing effluent from the cell containing the oxide of said normally gaseous olefin.

11. A process for the manufacture of an olefin oxide which comprises subjecting an aqueous medium comprising an oxygen-containing ternary salt to the action of an electrical current to generate oxygen at the anodic surface, passing a normally gaseous olefin to the cell such that it is brought into contact with the anodic surface, said anodic surface comprising silver, maintaining said aqueous medium in the liquid phase and at a temperature of at least 75° F., and withdrawing effluent from the cell containing the oxide of said normally gaseous olefin.

12. A process for the manufacture of an olefin oxide which comprises subjecting an aqueous medium contained in an electrochemical cell and having a water soluble oxygen-containing compound dissolved therein to the action of an electrical current such that oxygen is generated at the anodic surface, said anodic surface comprising silverized graphite, passing a normally gaseous olefin to the cell such that it is brought into contact with said anodic surface, maintaining said aqueous medium in the liquid phase and at a temperature of at least 75° F., and withdrawing effluent from the cell comprising the oxide derivative of said normally gaseous olefin.

13. The process for the manufacture of an oxide of a normally gaseous olefin which comprises providing an electrochemical cell containing an aqueous medium having an alkali metal zincate dissolved therein, subjecting said aqueous medium to the action of an electrical current such that oxygen is generated at the anodic surface, said anodic surface comprising zinc, passing a normally gaseous olefin to the cell such that it is brought into contact with said anodic surface, maintaining said aqueous medium in the liquid phase and at a temperature of at least 75° F. and withdrawing effluent from said cell containing an oxide derivative of said normally gaseous olefin.

14. A process for the manufacture of ethylene oxide which comprises providing an electrochemical cell having at least one anode comprising silver and at least one cathode, feeding an aqueous medium having a water soluble oxygen-containing compound as electrolyte dissolved therein to said cell, subjecting said aqueous medium to the action of an electrical current such that oxygen is generated at said anode, passing ethylene to the cell such that it is contacted with oxygen generated at the anode, operating said cell at a temperature between about 75° F. and about 600° F. and at a pressure sufficient to maintain the aqueous medium in the liquid phase, withdrawing effluent from the cell comprising ethylene oxide and recovering ethylene oxide as a product of the process.

15. A process for the manufacture of propylene oxide which comprises providing an electrochemical cell having at least one anode comprising silver and at least one cathode, feeding an aqueous medium having a water soluble oxygen-containing compound as electrolyte dissolved therein to said cell, subjecting said aqueous medium to the action of electrical current such that oxygen is generated at said anode, passing propylene to the cell such that it is contacted with oxygen generated at the anode, operating said cell at a temperature between about 75° F. and about 600° F. and at a pressure sufficient to maintain the aqueous medium in the liquid phase, withdrawing effluent from the cell comprising propylene oxide and recovering propylene oxide as a product of the process.

16. A process for the manufacture of an oxide of an olefinic compound which comprises providing an electrochemical cell having at least one anode compartment and at least one cathode compartment separated by a fluid permeable diaphragm, and containing an aqueous medium having an oxygen-containing compound as electrolyte dissolved therein, subjecting said aqueous medium to the action of a direct electric current such that oxygen is generated at the anodic surface, passing an olefinc compound to the cell such that it is brought into contact with said anodic surface, said anode compartment being provided with a catalyst for the oxidation of said olefinc compound by oxygen generated at the anodic surface, operating said cell such that the aqueous medium is maintained in the liquid phase and at a temperature of at least about 75° F. and withdrawing effluent from the cell comprising the oxide derivative of said olefinc compound.

17. A process for the manufacture of an oxide of an olefinic compound which comprises subjecting an equeous medium contained in an electrochemical cell to the action of an electrical current to generate oxygen at the anodic surface, passing an olefinic compound to said cell such that it is brought into contact with said anodic surface, passing an oxygen-containing gas to the cell such that it is brought into contact with the cathodic surface, maintaining said aqueous medium in the liquid phase at a temperature of at least 75° F. and withdrawing effluent from said cell comprising the oxide of said olefinic compound.

18. A process for the formation of an oxide of an olefinic compound and generation of electrical energy which comprises in combination the steps of subjecting an aqueous medium contained in an electrochemical cell and having an oxygen-containing electrolyte dissolved therein, to the action of an electrical current such that oxygen reactant is generated at the anodic surface and hydrogen is generated at the cathodic surface, maintaining said aqueous medium in the liquid phase and at a temperature of at least 75° F., passing an olefinic compound to said cell such that it is brought into contact with the oxygen generated at the anodic surface, said anodic surface comprising a catalyst for the oxidation of the olefinic compound with said oxygen to produce an oxide of said olefinic compound, passing hydrogen generated at said cathodic surface to a fuel cell in combination with said electrochemical cell, in said fuel cell contacting said hydrogen with the anodic surface and an oxygen-containing gas with the cathodic surface such that electrical energy is generated.

References Cited

UNITED STATES PATENTS

| 1,253,617 | 1/1918 | McElroy | 204—80 |
| 1,365,053 | 1/1921 | Ellis et al. | 204—80 |
| 3,147,203 | 9/1964 | Klass | 204—78 |
| 3,180,813 | 4/1965 | Wasp et al. | 204—129 |
| 3,280,014 | 10/1966 | Kordesch et al. | 204—78 |

FOREIGN PATENTS 910,870  11/1962  Great Britain.

JOHN H. MACK, *Primary Examiner.*

H. M. FLOURNOY, *Assistant Examiner.*

U.S. Cl. X.R.

136—086

PO-1050
(5/69)

UNITED STATES PATENT OFFICE
CERTIFICATE OF CORRECTION

Patent No. 3,427,235   Dated February 11, 1969

Inventor(s) Joseph Adrien M. LeDuc

It is certified that error appears in the above-identified patent and that said Letters Patent are hereby corrected as shown below:

Column 4, line 8, for "olefinite" read --olefinic--; line 56, for "of" read --or--; line 65, before "700" insert --about--. Column 6, line 45, for "calls" read --cells--. Column 9, line 9, for "to" read --of--; line 17, for "mol." read --mol)--; line 20, for "therin" read --therein--; line 31, for "bromohydride" read --borohydride--; line 66, for "sodim" read --sodium--. Column 13, line 47, for "equeous" read --aqueous--.

SIGNED AND
SEALED
SEP 22 1970

(SEAL)
Attest:

Edward M. Fletcher, Jr.
Attesting Officer

WILLIAM E. SCHUYLER, JR
Commissioner of Patents